United States Patent [19]
Deeg et al.

[11] 3,768,992
[45] Oct. 30, 1973

[54] TOUGHENING OF OPHTHALMIC LENS BLANKS

[75] Inventors: Emil W. Deeg, Woodstock, Conn.;
Leslie B. Martel, Sturbridge, Mass.

[73] Assignee: American Optical Corporation, Southbridge, Mass.

[22] Filed: Feb. 22, 1971

[21] Appl. No.: 117,820

[52] U.S. Cl. ............................. 65/116, 65/114
[51] Int. Cl. ........................................ C03b 27/00
[58] Field of Search ........................... 65/114, 116

[56] References Cited
UNITED STATES PATENTS
178,797   6/1876   O'Neill ........................... 65/116
2,194,730   3/1940   Wilson ........................... 65/116
3,356,476   12/1967   Gulotta ........................... 65/32

*Primary Examiner*—Arthur D. Kellogg
*Attorney*—William C. Nealon, Noble S. Williams and Robert J. Bird

[57] ABSTRACT

Impact resistance of lenses treated according to the invention is increased by quenching in a molten metal under a non-oxidizing or slightly reducing atmosphere.

4 Claims, No Drawings ions by the prior art procedures.

TOUGHENING OF OPHTHALMIC LENS BLANKS

BACKGROUND OF THE INVENTION

It is desirable to impart improved impact resistance to ophthalmic lenses in order to reduce the possibility of damage to the eye of a wearer due to lenses shattering upon impact with high speed projectiles. It has been a standard practice to produce glass ophthalmic lenses with impact resistance better than untreated glass by preheating annealed lenses to a temperature slightly below their softening point and rapidly quenching them in air to below their annealing temperature. It has also been a practice to quench the preheated lenses by rapidly submerging them in an organic bath. The liquid in the bath is characterized by a high heat of evaporation. One example of such an organic liquid is, for example, an automobile motor oil. In both these prior art procedures, the quenching results in a permanent compression generated across the surfaces of the lenses whereby the impact resistance of the quenched lens at room temperature is increased.

A major disadvantage of both methods is that the relatively low thermal conductivity of organic liquids does not allow quenching of thin lenses rapidly enough to produce a significant amount of compression in the surface. Furthermore, organic liquids are difficult to handle at elevated temperatures because of the fumes generated.

Two other prior art methods of quenching annealed lenses include placing them in an inorganic salt bath, for example, potassium nitrate. The phenomena by which increased impact resistance is obtained is ion exchange, or quenching.

OBJECTS OF THE INVENTION

It is among the objects of the invention to provide glass opthalmic lenses of improved impact resistance. It is an additional object of the invention to provide a method of obtaining improved impact resistance in glass ophthalmic lenses which is particularly susceptible to continuous manufacturing procedures.

THE INVENTION

It has now been discovered that improved impact resistance is obtained by quenching preheated ophthalmic lenses in liquid metals such as mercury, or in molten metals such as lead, tin, bismuth, cadmium, gallium, indium, thallium, and low melting alloys of these metals. By low melting we mean a temperature of less than about 800°F. The improved impact resistance is obtained without fracturing thin glass lenses during the quenching process. It also produces a high degree of surface compression which is the primary reason for the significantly improved impact resistance.

PREFERRED EMBODIMENT OF THE INVENTION

In the preferred embodiment of the invention the liquid or molten metal quenching occurs under an inert or slightly reducing atmosphere, thus to prevent oxidation of the metal bath. In the preferred embodiment of the invention, the bath is molten tin. The preferred atmosphere is ideally a mixture of 5 percent hydrogen ($H_2$) and 95 percent nitrogen ($N_2$). The temperature of the bath depends on the thickness of the lens. The thicker the lens the higher the temperature. The following table provides specific examples of the preferred particulars of this invention for a 3.4 and a 2.2 millimeter thick ophthalmic crown glass plano lens blank.

Table 1

| Lens thickness (in mm.) | Preheating Temperature (in degrees Fahrenheit) | Time (in minutes) | Quenching Temperature of tin bath (in degrees Fahrenheit) | Time lenses were left in bath (in minutes) |
|---|---|---|---|---|
| 3.4 | 1200 | 4.5 ± 1.0 | 850 | 1 ± 0.5 |
| 2.2 | 1200 | 3.0 ± 0.5 | 800 | 1 ± 0.5 |

In an actual experiment conducted to check the feasibility of toughening lenses by preheating and quenching them in molten metal, there were two types of lenses treated, the first type were 48 mm finished ophthalmic plano lens blank, 3.4 mm thick; the second type were 48 mm finished ophthalmic plano lens blank, 2.2 mm thick. There were 12 lenses of each type, each lens being treated individually.

Approximately 3.5 lbs. of pure tin was put into a one pound ceramic crucible. This amount of tin was sufficient to allow a lens to be submerged completely while being held in a sling made from .065 nichrome wire. The sling made point contact at the edge of each lens. A thermocouple was placed into a fused silica protective tube and then submerged into the tin. The temperature of the tin bath was not stable; it varied plus or minus 20° between off and on periods of the furnace heater; however, it was possible to time the treating of the lens when the tin was at the desired temperature.

Upon removal from the bath, the lenses appeared to have particles of slag stuck to the surfaces, the slag had formed on top of the tin bath. This slag was wiped from the lens with a cotton glove. The lens was then placed on an asbestos plate to cool to room temperature.

For preheating the upper temperature is slightly below the deformation temperature of the particular type of glass being treated. Actually, the upper and lower temperatures for the preheating stage are difficult to define. It is desirable to be as close to the deformation temperature as possible. For any given particular glass, routine laboratory testing will make obvious to one skilled in the art what that temperature should be.

As noted above, the quenching temperature is preferably below 800° F. Actually, the lower the temperature the better. As indicated in the above table, however, thicker lenses require higher quenching temperatures. The 3.4 millimeter blank was ideally quenched at 850°F. As a practical matter, the ideal quenching temperature would be found in mercury at room temperature. By and large this is not practical though. With room temperature mercury and thicker lenses, the quenching is so fast the lenses will shatter. Thus, for a given glass blank its thickness determines the most rapid quenching rate it can undergo without cracking or destroying itself. Of course, quenching time is dependent on how long it takes the preheated blank to reach the temperature of the bath and this is going to be determined by the thickness of the lens, the temperature of the bath, and the volume of the bath, the thermal conductivity of the lens and the heat transfer coefficient of the lens-bath interface. Our process is ideally suited for thinner lenses which were the most difficult ones to treat by prior art processes. This is, in fact, one of the most important aspects of our discovery.

To provide some measure of the improvements and benefits obtained by practice of the present invention the following table was prepared.

TABLE 2

Impact Resistance as measured according to Z80 Dropped Ball Test as used in Optical Industry, with the exception of fixed drop ball height.

| Lens Thickness (in mm.) | Condition of Lens | Minimum impact resistance in inch-pounds |
|---|---|---|
| 3.4 | annealed | 1.9 |
| 3.4 | air quenched | 24.0 |
| 3.4 | metal quenched | 4.6 |
| 2.2 | annealed | 1.5 |
| 2.2 | air quenched | 2.5 |
| 2.2 | metal quenched | 3.1 |

The minimum impact resistance figures given for the annealed and air quenched lenses are typical for commercial products now found in the marketplace. It should be understood the numbers assigned for the metal quenching in the above table were obtained in rudimentary laboratory tests. For the 3.4 millimeter lens values as high as 11.57 were obtained. For the 2.2 millimeter lens a value as high as 10.42 was obtained. It was surprising that such high numbers could be obtained in these preliminary experiments.

The 3.4 millimeter lens is of the type normally used in safety goggles and is considerably thicker than that usually encountered in ophthalmic uses. A comparison of the data found in the table thus clearly establishes the suitability of the present process for thin ophthalmic lenses. By thin ophthalmic lenses we mean lenses in the range less than 2.4 millimeter center thickness. What is even more significant, however, is the applicability of the present invention to lenses having a thickness in the range .6 — .8 millimeter as found in strong negative prescription lenses.

Having thus described the invention in detail and with sufficient particularity as to enable those skilled in the art to practice it, what is desired to have protected by Letters Patent is set forth in the following claims.

We claim:

1. The method of imparting increased impact resistance to ophthalmic glass lenses having a thickness of less than two and one-half millimeters comprising preheating the glass lenses to a temperature approaching the deformation temperature of the lens, immersing the preheated lens while still at its elevated temperature into a bath of metal, the temperature of the bath being substantially in the range of 800°F to 850°F, said immersion taking place in an inert or slightly reducing atmosphere, maintaining the lens in the bath until such time as the lens reaches the temperature of the bath, and removing the treated lens from the bath.

2. The method according to claim 1 in which the metal is selected from the group consisting essentially of liquid mercury, and the molten metals tin, lead, bismuth, cadmium, gallium, indium, thallium, and low melting alloys of these metals.

3. The method of claim 1 wherein the center thickness of said lens is in the range of approximately .6 to .8 millimeter.

4. The method of claim 1 including the step of annealing said lens prior to preheating said lens for immersion into said bath.

* * * * *